Aug. 5, 1930.  H. A. SALLOP  1,772,088
FASTENING DEVICE
Filed June 28, 1927   2 Sheets-Sheet 1

Witnesses
C.E. Churchman Jr.
Wm R. Smith

Harry A. Sallop,
INVENTOR.

BY Richard B. Owen
ATTORNEY.

Aug. 5, 1930.                H. A. SALLOP                1,772,088
                          FASTENING DEVICE
                     Filed June 28, 1927      2 Sheets-Sheet 2
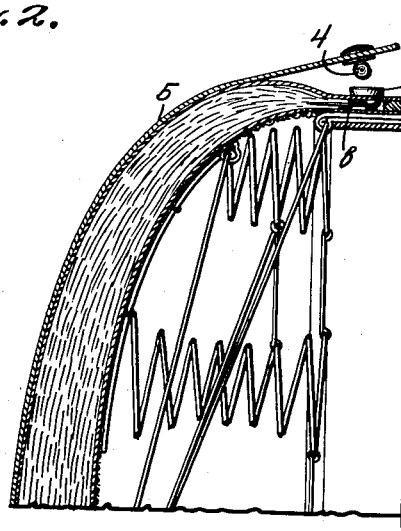
Fig. 2.
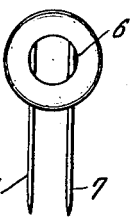
Fig. 5.
Fig. 6.
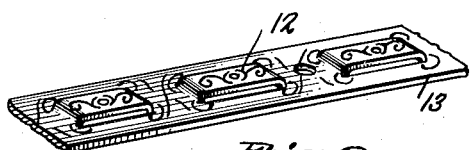
Fig. 9.
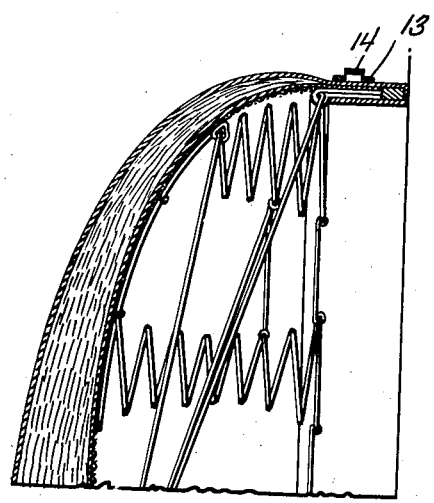
Fig. 8.
Fig. 7.
Harry A. Sallop, INVENTOR.
BY Richard B. Owen
                ATTORNEY.
Witnesses
C. E. Churchman
Wm. R. Smith Patented Aug. 5, 1930

1,772,088

UNITED STATES PATENT OFFICE

HARRY A. SALLOP, OF NEW YORK, N. Y.

FASTENER DEVICE

Application filed June 28, 1927. Serial No. 202,112.

This invention relates to a fastener device for automobile covers and has for its primary object the design of a fastener that may be more effectively secured to the automobile structure without the necessity of materially increasing the production cost thereof.

An object of the invention is the provision of a retaining member as a component part of the fastener to be permanently attached to the body structure of the automobile in positions to be effectively engaged by the fastener elements associated with the cover.

Another object of the invention is the design of a fastener of a more substantial character throughout and which will not mar or mutilate when the covers are subject to an undue strain.

A feature of the invention is the construction of a fastener that will in no manner mar the upholstering and having certain structural features as to positively eliminate the tearing of the upholstery thereby overcoming the vital defects of fasteners heretofore designed for securing covers to the body of an automobile.

Besides the above, my invention is distinguished in the use of a retaining strip arranged in an invisible position but capable of being quickly located by an experienced person for the attachment of the fasteners directly to the retaining strip, brought about by providing the strip with projections that may be located by pressing against the upholstery at a point adjacent the retaining strip.

Figure 1:
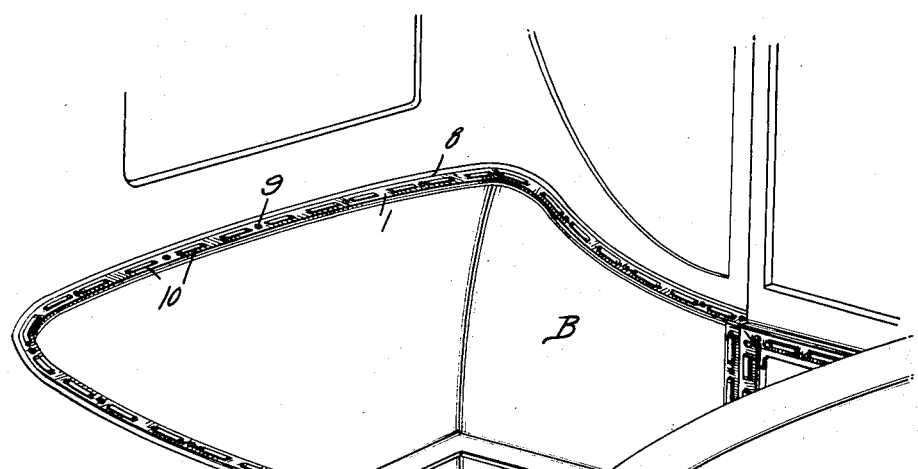
Figure 3:
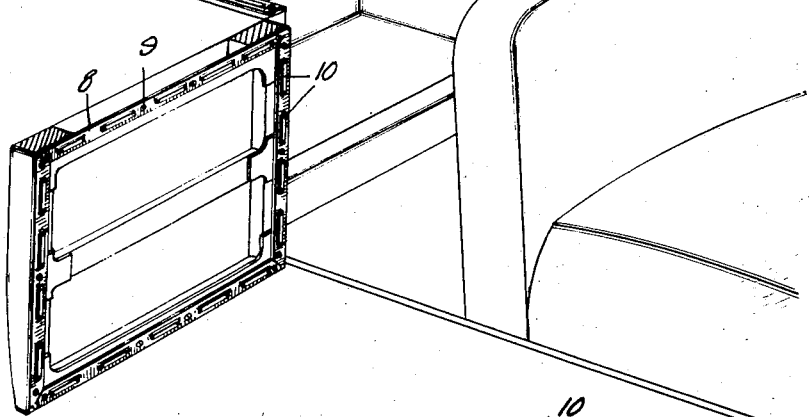
Figure 3:
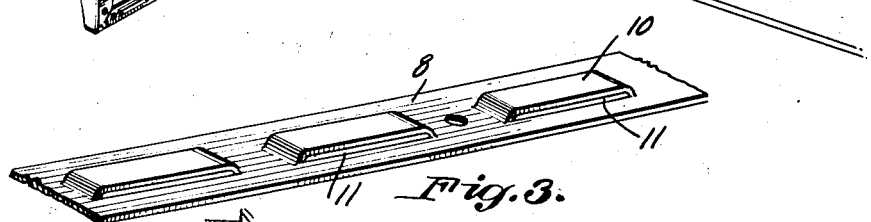
Figure 4:
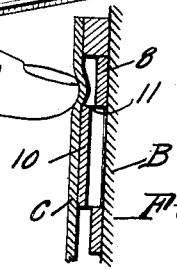

With these and other objects in view the invention will be better understood from the following detailed description taken in connection with the accompanying drawings, wherein:

Figure 1 is a diagrammatic view of a portion of an automobile illustrating the retaining strip in position, Figure 2 is a fragmentary sectional view of a seat structure showing my invention applied thereto, Figure 3 is a fragmentary perspective view of the retaining strip, Figure 4 is a vertical sectional view of the retaining strip and associated parts, Figure 5 is a side elevation of one type of fastener element, Figure 6 is a side elevation thereof, Figure 7 is a front elevation of another type of fastener element, Figure 8 is a fragmentary sectional view of a seat structure showing the retaining strip in a visible position, Figure 9 is a view similar to Figure 3 showing the strip ornamented.

Again referring to the drawings it will be noted that the improved fastener device consists of three major elements, namely, a retaining member or strip 1, a fastener element 2, secured to the seat cover and a fastener element 3 engageable with the seat structure and heretofore mentioned strip 1. These component parts are designed to interlock with each other in a manner to effectively stretch the cover over the seat structure and positively lock the same against dislocation unless the various parts are subject to a disengaging action in a predetermined direction. In this particular illustration of the invention, the fastener element 2 illustrated as a ball section 4 is permanently secured to the seat cover 5 and panel covers as set forth in my co-pending applications. This ball section 4 is adapted to snap into engagement with the fastener element 3 illustrated as a socket section 6 provided with a pair of penetrating pin shanks 7. As the types of pin fasteners shown in Figures 5, 6 and 7 are more clearly set forth and claimed in my various co-pending applications, further detail consideration of the structural features will be eliminated, as the basic feature of the present invention resides in the combination of fastener elements and a retaining strip for providing a more effective engagement between the pin elements and the body structure of an automobile to prevent the upholstery from being subject to an undue strain in the use of the covers.

Various types of retaining members or retaining strips may be utilized in my invention provided the construction thereof is such as to be able to be permanently attached to the structure of the automobile. In this particular case the retaining member is in the form of a strip 8 attached at spaced points to the body structure "B" of the automobile by the securing elements 9. At spaced points this strip has struck therefrom clips or projecting lugs 10, providing parallel slots 11 on opposite sides of the lugs. As the lugs are of an elongated formation, they have resilient properties utilized to obtain a more effective grip between the pin shanks and the lugs and to accomplish this desired result, the slots 11 are of a predetermined area so as to create a wedging action when the pin shanks are inserted through the slots for interlocking engagement with the lugs. As shown in Figures 1 to 4 inclusive, the strip is arranged in an invisible position under the upholstery C with the lugs 10 paralleling the upholstery so that when pressure of the finger is applied at point D the location of the various lugs may be readily determined for the reception of the pin shanks 7 when the latter has been slid along the surface of the strip into engagement with the under surface of the lug for passage through the slots 11. When this effect has been accomplished there is a positive metallic interlocking engagement between the fastener element and the strip and due to the resilient properties of the lug the fastener element will be effectively held in its proper position and besides all strain is directly taken up by the strip and transmitted to the body structure to prevent marring or tearing of the upholstery. As the retaining strip is permanently arranged in an invisible position it is not compulsory upon the owner of a car to apply seat covers to the upholstery, but if he so desires, application of covers to the upholstery can be readily accomplished by attaching the fastener elements as heretofore set forth. Due to the contour and structural features of the retaining strip the ornamental effect of the upholstery is not interfered with in any manner whatsoever, as the strips are secured in place during the manufacture of the body and previous to the application of the upholstery.

It is of course to be understood that the strips may be of an ornamental design as indicated at 12 in Figure 9, so that the strip may perform the dual function of securing the edges of the upholstery in place and providing attaching means for various types of fasteners. In this particular case the strip 13 is positioned upon the top of the upholstery with the lugs 14 projecting upwardly.

In concluding, I wish to call particular attention to the fact that the strip may be designed in various other manners than illustrated and may be provided with various other types of attaching lugs, and besides various types of fastener elements may be utilized with the type of retaining strip installed, and, therefore, I do not desire to be limited in protection in any manner whatsoever, except as set forth in the following claims.

What I claim is:

1. In combination a retaining strip having elongated lugs struck therefrom and fasteners including pin elements adapted to have interlocking engagement with said lugs.

2. In combination a retaining strip for attachment to an automobile structure and provided with outwardly struck lugs adapted to be positioned in parallel relation with the upholstery of the automobile, whereby the lugs can be located by pressure against the upholstery, and fasteners including pin elements adapted to be passed through the upholstery and into interlocking engagement with said lugs.

3. A retaining strip having a lug struck therefrom providing slots on opposite sides of the lug, and a snap fastener including shank elements adapted to be passed through said slots so as to have interlocking engagement with the lug.

4. A strip having an elongated lug struck therefrom having resilient properties and a fastener including a penetrating shank adapted to be slid along said strip into interlocking engagement with said lug.

5. As a new article of manufacture, a fastener device for securing the upholstery covering of an automobile to the seat back thereof, comprising a strip shaped to conform to and adapted to lie upon the top edge of the seat back, and fasteners each extending transversely of the strip and having a transverse sliding interlocking engagement therewith.

6. As a new article of manufacture, a fastener device for securing the upholstery covering of an automobile to the seat back thereof, comprising a strip shaped to conform to and adapted to lie upon the top edge of the seat back, fasteners each extending transversely of the strip and having a transverse sliding interlocking engagement therewith, and securing elements for directly securing the strip to the seat back.

In testimony whereof I affix my signature.

HARRY A. SALLOP.